Oct. 25, 1966 R. H. MILLER 3,280,820
CARD INDEX HOLDER
Filed Feb. 11, 1964 2 Sheets-Sheet 1

Inventor
Robert H. Miller
By Marion, Smith & Nardell
Attorneys

Oct. 25, 1966 R. H. MILLER 3,280,820
CARD INDEX HOLDER
Filed Feb. 11, 1964 2 Sheets-Sheet 2
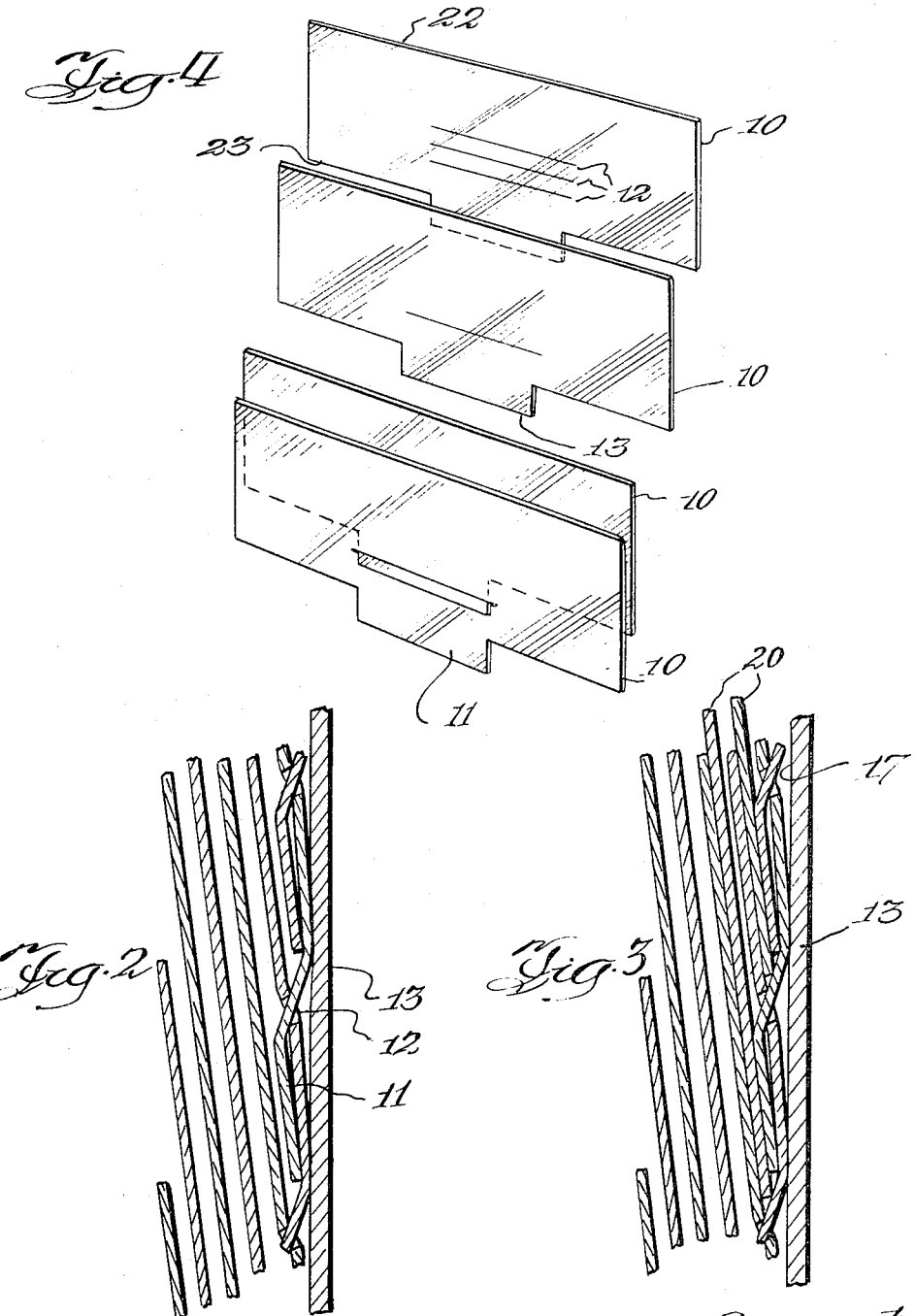
Inventor
Robert H. Miller
By Merriam, Smith & Marshall
Attorneys

United States Patent Office 3,280,820
Patented Oct. 25, 1966

3,280,820
CARD INDEX HOLDER
Robert H. Miller, 5415 Grand Ave., Western Springs, Ill.
Filed Feb. 11, 1964, Ser. No. 344,053
1 Claim. (Cl. 129—20)

This invention relates generally to a card index and the method for making the same, and more particularly, to a visual card index having a plurality of retaining sheets fused to at least one side of a flexible backing sheet.

In instances where it is desired to have a series of cards or the links indexed in a staggered or overlapped position, it has been found that conventional card indexes are unsatisfactory in many respects. Many holders presently available are heavy, bulky, metallic units which are quite difficult to manipulate. Additionally, conventional units are quite expensive because of the excessive amount of time, labor and material which are required in the manufacturing process. For example, some units are formed by attaching a card retaining sheets to a wire strip after which the ends of wire strip, which extend beyond the length of the retaining sheet, are fastened to a backing sheet by means of an adhesive strip or other fastening means.

Other holders presently available on the market are constructed from one sheet of material which is folded in an accordion-like manner so that overlapped card retaining pockets are formed. However, such a holder is costly and time consuming to manufacture and is extremely limited as to the number of retaining pockets that can be formed.

Again, some holders have merely the edges of the backing sheet overlapped. A card or the like to be indexed is inserted into a plastic filler and the filler is then located in the holder so that each of the filler ends is positioned under the overlapped edges of the backing sheet. This type of unit is not particularly suitable to most needs due to the amount of time required for an individual to first insert a card into the plastic filler and then insert the filler into its retaining position on the backing sheet. Moreover, a mere shifting or cocking of a filler sheet will release it from its position under the overlapped edges.

In order to eliminate the disadvantages presently inherent with card index holders, I have invented a holder which is light, flexible and durable. Further, the cost of my inventive device is extremely attractive since both the number of components and the steps involved in the process of making my unit are quite few in number.

In my invention, a plurality of retaining sheets which are tabbed and slit are connected together to form a series of overlapped indexing or retaining pockets. The overlapped sheets are then fused to a flexible backing sheet to complete my card index holder. In an assembled condition, cards can be inserted into the various retaining pockets where they are readily accessible.

With the tabbing and slitting operation which is employed in my invention, the retaining sheets can be connected so that the desired card stop or amount of sheet overlapping is provided.

Other features and advantages are inherent in the construction claimed and disclosed which will be apparent to those skilled in the art from the following detailed description in conjunction with the accompanying drawings wherein:

FIGURE 2 shows a fragmentary, sectional view of my folder taken along line 2—2 in FIGURE 1;

FIGURE 3 shows a fragmentary, sectional view, similar to FIGURE 2, save that cards are shown inserted in the respective retaining pockets of my index card holder;

FIGURE 4 shows the connection of the tabbed and slit retaining sheets wherein a tab or projection on one sheet is inserted into the slit of an adjoining sheet;

Figure 1:
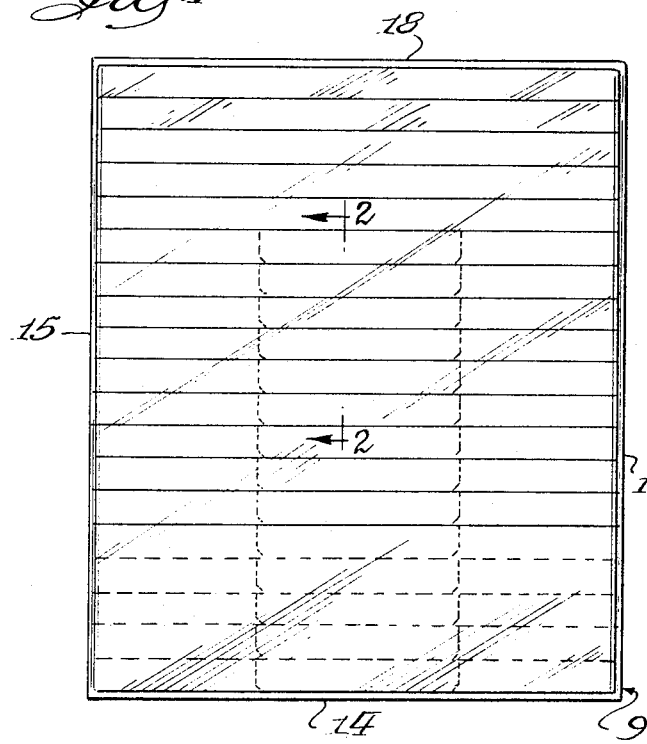
FIGURE 1 shows a plan view of my index card holder.

Referring more particularly to FIGURE 4, a plurality of retaining sheets 10 having tabs or projections 11 are slit at 12. The length of slit 12 in this embodiment of my invention should be at least equal to the length 13 of tab 11. However, the projection could easily be designed to have a shape, e.g., triangular shaped projection, wherein the slit would not need to be as long as the length of the projection. Each of the sheets could be tabbed and slit in a number of places, if desired. The retaining sheets are ordinarily made of polyvinyl chloride although, if desired, the sheets could be made of any other suitable material.

To provide the card index stop for the various retaining pockets, projection 11 of one retaining sheet is inserted within slit 12 of another retaining sheet. The effect of having such a retaining sheet construction is that the retaining pockets can be readily assembled with a minimum amount of material and assembly time. Further, the individual retaining sheets 10 are quite desirable since they can be readily die-cut to provide the slit and projection in one operation. Additionally, if desired, a number of parallel slits could be placed in the retaining sheets so that upon assembly of the sheets in the course of forming overlapped card retaining pockets, one, by selecting the proper slit, can easily select the desired amount of overlap between the pockets or sheets.

Following assembly of the retaining sheets 10, the sheets are positioned on the front face 17 of backing sheet 13, which is generally made of a vinyl material, though it could easily be made of other suitable material. Sheet 13 has ends 14, 18 and sides 15. By employing a heat sealing device, e.g., electronic fusing machine, the retainer sheets can be fused to face 17 at the periphery of backing sheet 13. With the retainer sheets fused to backing sheet 13, cards 20, FIGURE 3, can be inserted into the retainer pockets, the cards falling to the bottom of the respective pockets as determined by the intersection of the projection and slit in the respective pockets. The sheets need only be fused at the bottom end 14 and sides 15 of the holder 9; however, if desired, the periphery of the holder at end 18 could also be fused to the retaining sheet.

The retainer sheet located on the bottom of my card index holder need not be tabbed or slit because its retaining pocket will be formed during the course of the fusing operation wherein the sides and bottom of this particular retaining sheet will be fused to the backing sheet. It is appreciated, however, that a tabbed and slit retaining sheet could be employed at the bottom of my holder without any adverse effect.

Figure 5:
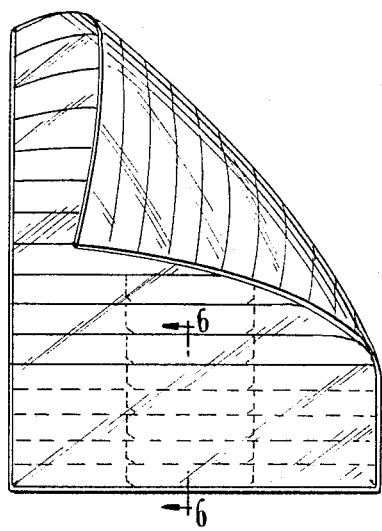
FIGURE 5 shows a series of retaining pockets located on both the front and back sides of a backing sheet.
Figure 6:
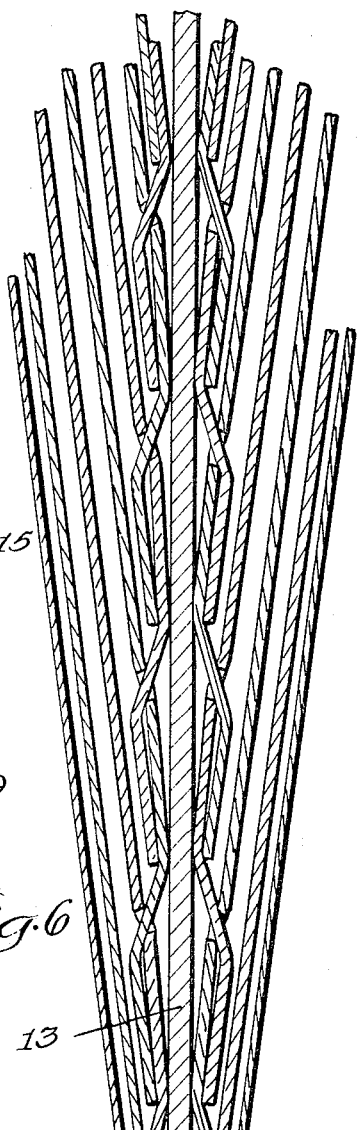
FIGURE 6 shows a fragmentary, sectional view of the folder taken along line 6—6 in FIGURE 5.

In FIGURE 5 and 6, I have shown retaining pockets located on both the front and back faces 17, 19 respectively, of backing sheet 13. The assembly of the folder shown in these figures is similar to the assembly shown in FIGURE 1–4 save in the course of the fusing operation an additional set of retaining pockets 21 is fused to the back face of sheet 13.

As has been indicated previously, although the projections have been shown as being die-cut in the form of a rectangle, it is apparent that other shapes could be adapted for the tabs. Also, by moving the location of slit 12 to different locations or by providing a plurality of slits 12 between the top and bottom edges 22, 23 of a retaining sheet there is provided an adjusting means for selectively determining the proper retaining pocket depth.

If desired, the retaining pockets can be fused to a vinyl backing sheet 13 such that one side of the vinyl extends beyond the line of fusion between the retaining sheet and backing sheet, thus exposing a small strip of vinyl. This can be punched and my visual index holder can then be inserted into a ring-type or other suitable binder.

Aside from fusing the retaining sheets to the sides of the backing sheet, the retaining sheets could also be sealed to the backing sheet at other locations, e.g., fusing the retaining sheets to the backing sheet along the center line of the backing sheet, with the result that the number of separate card retaining pockets is increased.

The sizes of my card index holder can be varied with little difficulty to fit cards or the like of varying dimensions. The number of retaining pockets can also be varied depending only upon the particular application for which my holder is used.

It is readily apparent that I have invented a novel lightweight, durable card index holder which is very economical to manufacture. My holder can, with a minimum of expense, be made to accommodate many different sizes of cards to be indexed.

The foregoing detailed description has been given for clearness of understanding only, and no unnecessary limitations should be understood therefrom, as modifications will be obvious to those skilled in the art.

What is claimed is:

A card index holder, said holder consisting solely of:

a plurality of substantially identical first flexible, transparent, plastic retaining sheets, each of said sheets having a top, bottom and side edges and having at least one tab projecting from at least the middle of the bottom edge of each of said sheets;

each of said first retaining sheets further having a slit located at the middle of said sheet, said slit being of a length about equal to the length of said tab, said slit being spaced from said tab;

the tab on one of said first retaining sheets being inserted through a slit in another of said first retaining sheets whereby each of said first retaining sheets is overlapped in a fixed, interlocked position relative to said first remaining retaining sheets such that said side edges of said interlocked sheets are substantially aligned;

a second flexible, transparent, plastic retaining sheet having a top, bottom and side edges being substantially identical in size to said first retaining sheets save said second retaining sheet is free of said tab and said slit;

a flexible, flat, plastic backing sheet having top, bottom and side edges, said overlapped first retaining sheets being positioned on at least one side of said backing sheet with said second sheet being positioned over a portion of said backing sheet and said overlapped first sheets, the bottom edge of said second retaining sheet being contiguous to said bottom edge of said backing sheet while the side edges of said second sheet are aligned with the side edges of said interlocked sheets and the bottom edge of said second retaining sheet is below the bottom edge of the next adjacent retaining sheet;

the side edges of both of said interlocked and overlapped first retaining sheets and said second sheet being longitudinally fused for the entire length of the side edges to said backing sheet thus forming composite, laminated side edges on said holder so that all of said substantially aligned side edges are fastened to said backing sheet so that said holder is free of any unfastened, open side edges;

the bottom edge of the second retaining sheet being fused to the bottom of said backing sheet; and, the top edge of the first retaining sheet contiguous to the top edge of said backing sheet being fused to the top of said backing sheet.

References Cited by the Examiner

UNITED STATES PATENTS

| | | | |
|---|---|---|---|
| 342,316 | 5/1886 | Bickford | 40—124 |
| 1,118,184 | 11/1914 | Chappee | 129—16 |
| 1,119,768 | 12/1914 | Thomas | 129—20 |
| 1,667,972 | 5/1928 | Horvath | 129—20 |
| 1,875,382 | 9/1932 | Hutchens | 129—16 |
| 2,354,769 | 8/1944 | O'Kane | 129—16 |
| 2,477,886 | 8/1949 | McCaskill | 129—20 X |
| 2,732,875 | 1/1956 | Martin | 129—20 |
| 2,871,153 | 1/1959 | Copen | 129—16 X |
| 2,888,932 | 6/1959 | Freiberg | 129—16 |

FOREIGN PATENTS

| | | |
|---|---|---|
| 212,027 | 3/1924 | Great Britain. |
| 878,982 | 10/1961 | Great Britain. |

JEROME SCHNALL, *Primary Examiner.*

Dedication 3,280,820.—*Robert H. Miller*, Western Springs, Ill. CARD INDEX HOLDER. Patent dated Oct. 25, 1966. Dedication filed Aug. 20, 1968, by the assignee, *Major Plastics, Inc.*

Hereby dedicates to the Public the remaining term of said patent.

[*Official Gazette September 24, 1968.*]